(12) United States Patent
Xu et al.

(10) Patent No.: US 12,159,392 B2
(45) Date of Patent: Dec. 3, 2024

(54) DIE SYSTEM AND METHOD OF COMPARING ALIGNMENT VECTORS

(71) Applicant: Applied Materials, Inc., Santa Clara, CA (US)

(72) Inventors: Yongan Xu, Santa Clara, CA (US); Chan Juan Xing, San Jose, CA (US); Jinxin Fu, Fremont, CA (US); Yifei Wang, Sunnyvale, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 290 days.

(21) Appl. No.: 17/753,555

(22) PCT Filed: Sep. 14, 2020

(86) PCT No.: PCT/US2020/050684
§ 371 (c)(1),
(2) Date: Mar. 8, 2022

(87) PCT Pub. No.: WO2021/071631
PCT Pub. Date: Apr. 15, 2021

(65) Prior Publication Data
US 2022/0392053 A1    Dec. 8, 2022

Related U.S. Application Data

(60) Provisional application No. 62/914,340, filed on Oct. 11, 2019.

(51) Int. Cl.
*G06T 7/33* (2017.01)
*G06T 7/00* (2017.01)

(52) U.S. Cl.
CPC .............. *G06T 7/0006* (2013.01); *G06T 7/33* (2017.01); *G06T 2207/30148* (2013.01)

(58) Field of Classification Search
CPC .................................. G06T 7/0006; G06T 7/33
See application file for complete search history.

(56) References Cited

U.S. PATENT DOCUMENTS

| | | |
|---|---|---|
| 5,763,057 A | 6/1998 | Sawada et al. |
| 2017/0256501 A1 | 9/2017 | Chao et al. |
| 2019/0148208 A1 | 5/2019 | Godet et al. |

FOREIGN PATENT DOCUMENTS

| | | |
|---|---|---|
| JP | 2007142328 A | 6/2007 |
| KR | 1020190013409 A | 2/2019 |

OTHER PUBLICATIONS

Japanese Office Action issued to Patent Application No. 2022-520957 on Jan. 23, 2024.

(Continued)

*Primary Examiner* — Sam Bhattacharya
(74) *Attorney, Agent, or Firm* — Patterson + Sheridan, LLP

(57) ABSTRACT

Embodiments of the present disclosure include a die system and a method of comparing alignment vectors. The die system includes a plurality of dies arranged in a desired pattern. An alignment vector, such as a die vector, can be determined from edge features of the die. The alignment vectors can be compared to other dies or die patterns in the same system. A method of comparing dies and die patterns includes comparing die vectors and/or pattern vectors. The comparison between alignment vectors allows for fixing the die patterns for the next round of processing. The methods provided allow accurate comparisons between as-deposited edge features, such that accurate stitching of dies can be achieved.

19 Claims, 6 Drawing Sheets

(56) References Cited

OTHER PUBLICATIONS

Korean Office Action issed to Application No. 10-2022-7015543 on May 15, 2023.
Japanese Office Action issued to Patent Application No. 2022-520957 on Jun. 13, 2023.
European Search Report issued to Application No. 20874556.2 on Oct. 27, 2023.
Korean Office Action issued to Patent Application No. 10-2022-7015543 on Nov. 29, 2023.
Korean Office Action issued to Patent application No. 10-2022-7015543 on Apr. 29, 2024.

DIE SYSTEM AND METHOD OF COMPARING ALIGNMENT VECTORS

BACKGROUND

Field

Embodiments of the present disclosure relate to an apparatus and a method and, more specifically, to a die system and a method of comparing alignment vectors.

Description of the Related Art

Virtual reality (VR) is generally considered to be a computer generated simulated environment in which a user has an apparent physical presence. A VR experience can be generated in 3D and viewed with a head-mounted display (HMD), such as glasses or other wearable display devices that have near-eye display panels as lenses to display a VR environment that replaces an actual environment.

Augmented reality (AR), however, enables an experience in which a user can still see through the display lenses of the glasses or other HMD device to view the surrounding environment, yet also see images of virtual objects that are generated for display and appear as part of the environment. AR can include any type of input, such as audio and haptic inputs, as well as virtual images, graphics, and video that enhances or augments the environment that the user experiences. In order to achieve an AR experience, a virtual image is overlaid on an ambient environment, with the overlaying performed by optical devices. VR and AR devices can be made by using lithography to deposit features onto a substrate to create a die. However, due the large size of the VR and AR devices in comparison to typical semiconductor lithography patterns, multiple dies and patterns must be stitched together accurately in order to create a functioning device.

One drawback in the art is that current stitching methods do not combine lithography patterns with enough accuracy to ensure a functioning device. In addition, once lithography patterns are deposited, determining how to fix the patterns in the next run of lithography is complicated. Also, there is no simple way to compare the expected feature critical dimensions (CDs) with the actually deposited feature CDs.

Therefore, what is needed in the art is accurate stitching together of dies for AR/VR devices.

SUMMARY

Embodiments herein include a die system and a method of comparing alignment vectors. Alignment vectors are determined from edge features and edge feature patterns of the die. A method of comparing dies and die patterns includes comparing die vectors and/or pattern vectors. The comparison between alignment vectors allows for fixing the die patterns for the next round of processing. The alignment vectors and methods allow for accurate stitching of dies.

In one embodiment, a die system is provided, including a plurality of dies. Each of the dies include a plurality of device features and one or more edge regions. Each edge region includes one or more edge boundary features and a plurality of edge features.

In another embodiment, a method of comparing alignment vectors is provided, including determining a first alignment vector $v_1$ for a first die, determining a second alignment vector $v_2$ for a second die, determining a die-die angle $\theta_{12}$ using the first alignment vector $v_1$ and the second alignment vector $v_2$, altering the first die pattern to a first altered die pattern based on the die-die angle $\theta_{12}$; and altering the second die pattern to a second altered die pattern based on the die-die angle $\theta_{12}$.

In yet another embodiment, a method for determining die alignment is provided, including creating a first plurality of edge features on a first die using a first die pattern, creating a second plurality of edge features on a second die using a second die pattern, determining a first alignment vector $v_1$ for the first die, determining a second alignment vector $v_2$ for the second die, determining a die-die angle $\theta_{12}$ using the first alignment vector $v_1$ and the second alignment vector $v_2$, altering the first die pattern to a first altered die pattern, and altering the second die pattern to a second altered die pattern.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure include a die system and a method of comparing alignment vectors. The die system includes a plurality of dies arranged in a desired pattern. An alignment vector, such as a die vector, can be determined from edge features of the die. The alignment vectors can be compared to other dies or die patterns in the same system. A method of comparing dies and die patterns includes comparing die vectors and/or pattern vectors. The comparison between alignment vectors allows for fixing the die patterns for the next round of processing. The methods provided allow accurate comparisons between as-deposited edge features, such that accurate stitching of dies can be achieved. Comparing a die vector and a pattern vector allows for compensation of the next die pattern due to errors in the first die pattern. The alignment vector provides a simple way to compare alignment and overlay between dies and die patterns. Embodiments of the disclosure may be useful for, but are not limited to, aligning dies in a die system.

As used herein, the term "about" refers to a +/−10% variation from the nominal value. It is to be understood that such a variation can be included in any value provided herein.

Figure 1A:
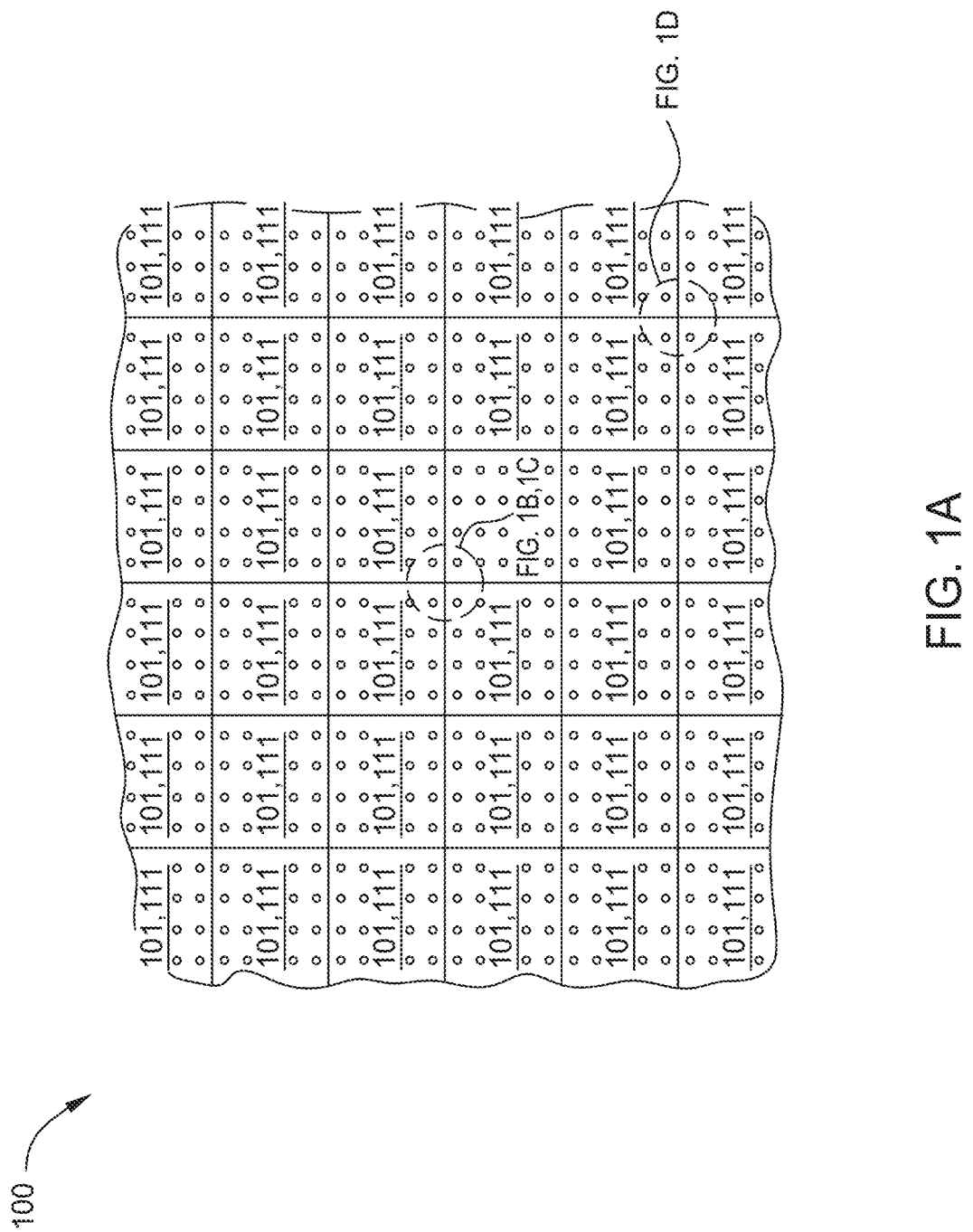
FIG. 1A illustrates a die system, according to one embodiment.

FIG. 1A illustrates a die system 100, according to one embodiment. The die system 100 is configured to be a lens for an optical device, such as a VR or AR headset or device. The die system 100 includes any material used for optical devices, such as, but not limited to, glass or plastic.

As shown, the die system 100 includes a plurality of dies 101 and a plurality of die patterns 111. As illustrated in FIG. 1A, each of the plurality of dies 101 and/or plurality of die patterns 111 is separated by solid lines. The die pattern 111 is the pattern of material to be grown to create a desired patterned die 101. Therefore, the die system 100 can include die patterns 111 (i.e., the desired pattern to be created), die 101 (i.e., the die as patterned), or a mixture of both at any given point in time.

Although the plurality of dies 101 and plurality of die patterns 111 are illustrated in a grid pattern, it is contemplated that the plurality of dies 101 and plurality of die patterns 111 can be in any arrangement. Each die 101 and/or die pattern 111 can have the same shape and/or dimensions as any other die and/or die pattern, or some of the dies and/or die patterns can have different shapes and/or dimensions from the other dies and/or die patterns. The number of dies 101 and/or die patterns 111, the arrangement of dies and/or die patterns, and the shapes and dimensions of the dies and/or die patterns are chosen by one skilled in the art in order to create the preferred optical device.

Figure 1B:
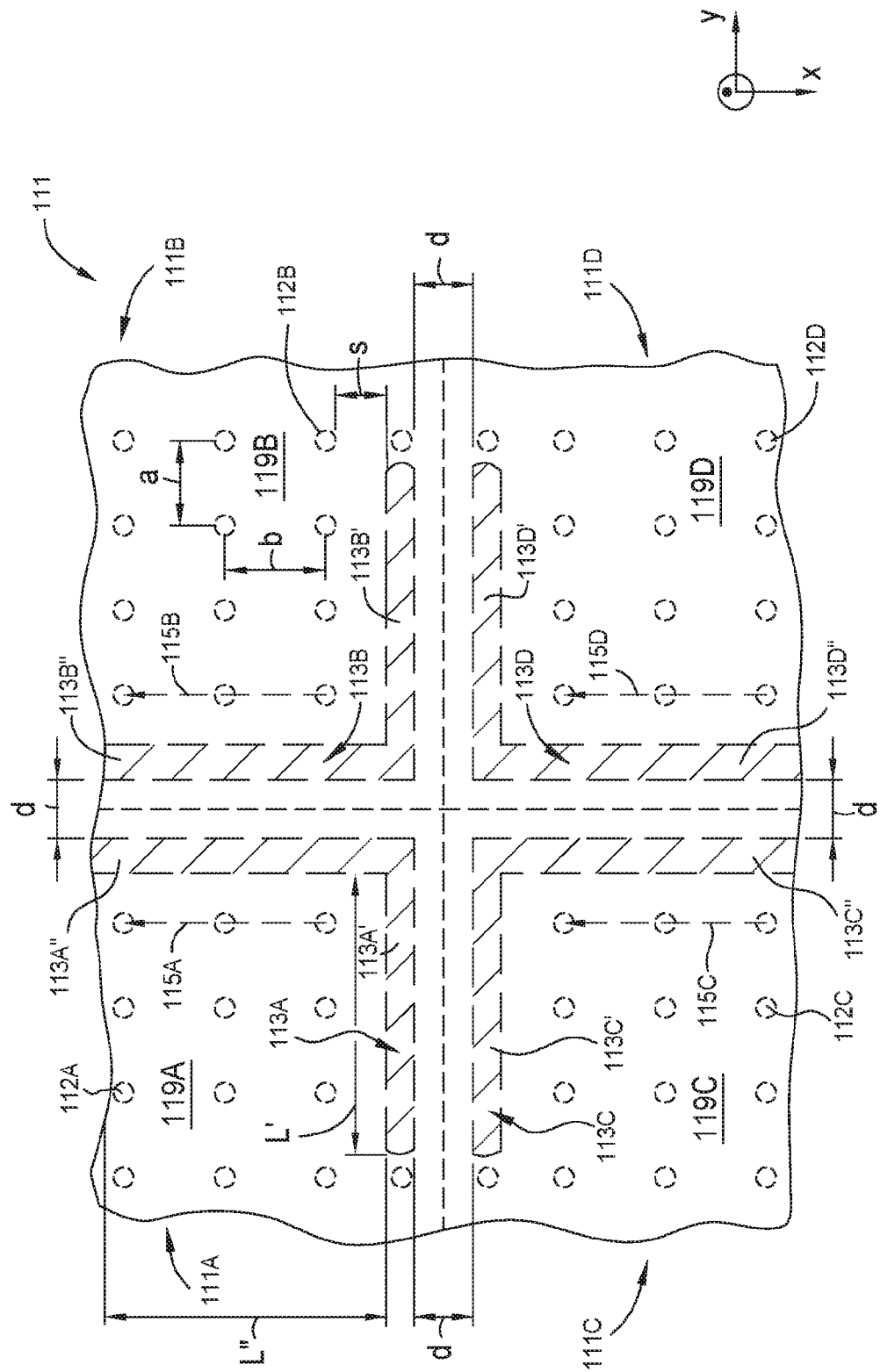
FIG. 1B illustrates a zoomed in portion of die patterns, according to one embodiment.

FIG. 1B illustrates a zoomed in portion of die patterns 111, according to one embodiment. The die patterns 111 can be any mask used in the art, such as a lithography mask, digital mask, or virtual mask. The zoomed in portion of FIG. 1B illustrates an exemplary intersection between die patterns 111A, 111B, 111C, 111D. FIG. 1B illustrates the die patterns 111 to be created in the corresponding dies 101 (illustrated in FIG. 1C). For example, the die patterns 111A, 111B, 111C, 111D are used to create the dies 101A, 101B, 101C, 101D of FIG. 1C.

Although the die patterns 111A, 111B, 111C, 111D illustrated in FIG. 1B are similar, it is to be understood that the die patterns 111A, 111B, 111C, 111D can be the same or different from one another, and thus the dies 101A, 101B, 101C, 101D deposited as described in FIG. 1C below can be the same or different for each die. Although not illustrated in FIGS. 1B-1C, which illustrate the corners of die patterns 111 and dies, it is to be understood that the die patterns extend through the entirety of the die pattern.

As shown, each die pattern 111 includes an edge pattern region 119 (e.g., die patterns 111A, 111B, 111C, 111D include edge patterns 119A, 119B, 119C, 119D respectively). The edge pattern region 119 is about 1 μm to about 10 μm wide. The size of the edge pattern region 119 is small enough that the functioning of the eventual die 101 is unaffected. As shown, the edge pattern regions 119, such as 119A, 119B, 119C, 119D, include a plurality of edge feature patterns 112, such as 112A, 112B, 112C, 112D, and one or more edge boundary feature patterns 113, such as 113A, 113B, 113C, 113D. Each of the plurality of edge feature patterns 112 are separated from one another by distances a, b in the x-direction, y-direction respectively. The a, b distances can be the same, or different in a given die pattern 111, or between die patterns, e.g., 111A and 111B. The a, b distances can vary throughout a given die pattern 111. The distances a, b can be from about 1 nm to about 5 μm. Although shown as a rectangular grid, it is to be understood that the edge feature patterns 112 can have any arrangement.

The edge boundary feature patterns 113 can have a first portion 113' with a length L' and a second portion 113" with a second length L". The lengths L', L" can be from about 100 nm to about 10 μm. The lengths L', L" for a given edge boundary feature pattern 113 can be the same or different from other edge boundary feature patterns, e.g., length L' of a first portion 113A' of an edge boundary feature pattern 113A is different from length L' of a first portion 113B' of an edge boundary feature pattern 113B. Although the edge boundary feature patterns 113 are shown having an L-shape, any shape is contemplated, such as a cross-shape. The distance d between adjacent first portions 113', e.g., the distance between 113A' and 113C', and the distance d between 113B' and 113D', can be the same or different. Likewise, the distance d between adjacent second portions 113", e.g., the distance d between 113A" and 113B", and the distance d between 113C" and 113D", can be the same or different. The distances d can be from about 50 nm to about 5 μm.

For each die pattern 111, a pattern vector 115 is defined by a direction and a distance between two or more features in the pattern. For example, a pattern vector 115A is defined by the distance between two edge feature patterns 112A. In another example, a pattern vector 115A is defined between an edge feature pattern 112A and a boundary feature pattern 113A (not shown). In yet another example, a pattern vector 115A is defined between an edge feature pattern 112A and a first portion 113A' of a boundary feature pattern 113A (not shown). In each case, each die pattern 111 (e.g., die pattern 111A) has a corresponding pattern vector 115 (e.g., 115A). In order to compare pattern vectors 115 between corresponding die patterns 111 (e.g., comparing pattern vector 115A for die pattern 111A to pattern vector 115B for die pattern 111B), the definition of the pattern vectors 115 between corresponding die patterns is consistent. FIG. 1B illustrates four die patterns 111A, 111B, 111C, 111D with their corresponding pattern vectors 115A, 115B, 115C, 115D.

For a virtual or digital mask, the pattern vector 115 can be determined digitally, e.g., measuring distances and angles by the pixels of the mask. For a physical mask, the pattern vector 115 can be determined using any desired imaging technique, such as scanning electron microscope (SEM). Other possible imaging techniques includes optical inspection and bright field inspection using any wavelength of light.

The pattern vectors 115 between adjacent die patterns 111 are used to compare the correct orientation and placement of the die patterns with respect to one another. For example, the pattern vector 115A of die pattern 111A can be compared to the pattern vector 115B of die pattern 111B. In FIG. 1B, the illustrated pattern vectors 115A, 115B are oriented correctly with respect to one another, and thus the die patterns 111A, 111B are correctly aligned.

Figure 1C:
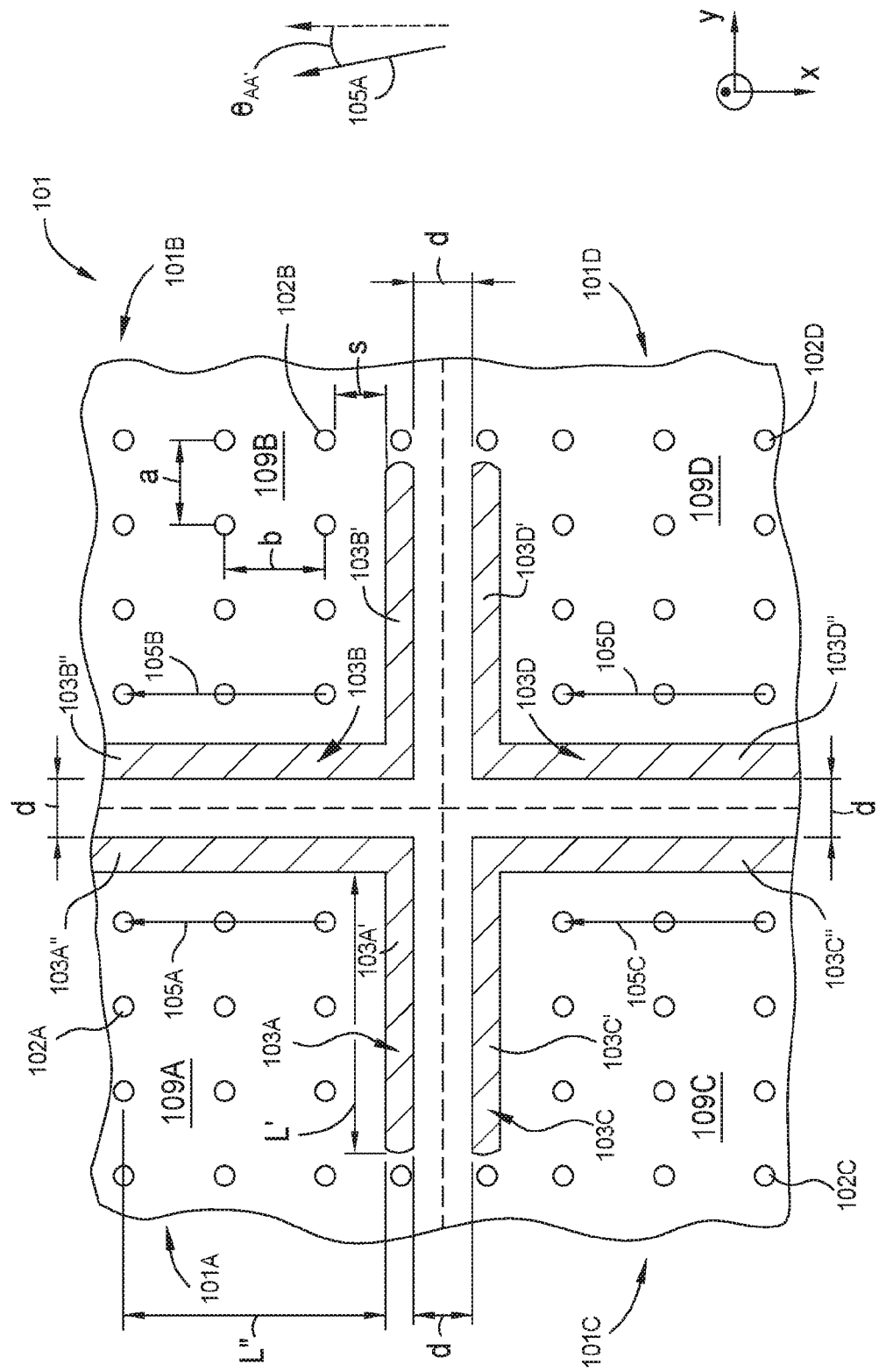
FIG. 1C illustrates a zoomed in portion of dies, according to one embodiment.

FIG. 1C illustrates a zoomed in portion of dies 101, according to one embodiment. The zoomed in portion of FIG. 1C illustrates an exemplary intersection between dies 101A, 101B, 101C, 101D. The dies 101A, 101B, 101C, 101D are the patterns deposited from the corresponding die patterns 111A, 111B, 111C, 111D illustrated in FIG. 1B. Although the dies 101A, 101B, 101C, 101D illustrated in FIG. 1C are similar, it is to be understood that the dies 101A, 101B, 101C, 101D can be the same or different from one another. Each of the dies 101 are configured to reflect and/or transmit certain wavelengths of light, depending on the intended function of the optical device.

As shown, each die 101 includes an edge region 109 (e.g., dies 101A, 101B, 101C, 101D include edge regions 109A, 109B, 109C, 109D respectively). Each of the edge regions 109 (e.g., 109A, 109B, 109C, 109D) include patterned material that corresponds to equivalent edge pattern regions 119 (e.g., 119A, 119B, 119C, 119D) of the die patterns 111 (e.g., 111A, 111B, 111C, 111D). The edge region 109 is about 1 µm to about 10 µm wide. The size of the edge region 109 is small enough that the functioning of the die 101 is unaffected. As shown, the edge regions 109, such as 109A, 109B, 109C, 109D, include a plurality of edge features 102, such as 102A, 102B, 102C, 102D, and one or more edge boundary features 103, such as 103A, 103B, 103C, 103D. Each of the plurality of edge features 102 (e.g., 102A, 102B, 102C, 102D) include patterned material that corresponds to the equivalent edge feature patterns 112 (e.g., 112A, 112B, 112C, 112D). Each of the plurality of edge boundary features 103 (e.g., 103A, 103B, 103C, 103D) include patterned material that corresponds to the equivalent edge boundary feature patterns 113 (e.g., 113A, 113B, 113C, 113D). The plurality of edge features 102 are separated from one another by distances a, b in the x-direction, y-direction respectively. The a, b distances can be the same, or different in a given die 101, or between dies patterns, e.g., 101A and 101B. The a, b distances can vary throughout a given die 101. The distances a, b can be from about 50 nm to about 5000 µm. Although shown as a rectangular grid, it is to be understood that the edge features 102 can have any arrangement.

The plurality of edge features 102 include any features used in optical devices in the art. The plurality of edge features 102 have CD's (such as height and width) of about 10 nm to about 100 µm, such as about 10 nm to about 100 nm, about 20 nm to about 200 nm, or about 60 nm to about 500 nm. The plurality of edge features 102 include vias or holes, according to one embodiment. The plurality of edge features 102 include space lines, according to one embodiment.

The plurality of edge features 102 include pillars, such as those used in metalens arrays, according to one embodiment. The plurality of edge features 102 have differing shapes depending on the desired spectrum of light to filter. The plurality of edge features 102 can be substantially circular, triangular, square, rectangular, or have an uneven shape. The plurality of edge features 102 can be made from any suitable high refractive index material, such as, but not limited to, silicon, silicon oxide, silicon nitride, titanium oxide, tantalum oxide, zirconium oxide, hafnium oxide, gallium arsenide, gallium nitride, and niobium oxide. The plurality of edge features 102 can also be made from metallic materials such as gold, silver, or copper.

The plurality of edge features 102 have a critical dimension (CD), such as width or radius, which is from about 20 nm to about 500 nm. The plurality of edge features 102 have a height which is from about 10 nm to about 2 µm. The CD, height, shape, material, and feature separation distance of the plurality of edge features 102 are selected to create dies 101 that filter out all but a narrow wavelength band of light, according to some embodiments.

In one embodiment, the plurality of edge features 102 are circular or elliptical shaped columns, the columns containing silicon dioxide ($SiO_2$), silicon (Si), titanium dioxide ($TiO_2$), gallium nitride (GaN) material, the columns having a radius of about 30 nm to 500 nm, the columns having a height of about 10 nm to 2 um, and the columns having a separation of about 30 nm to about 5000 nm.

The edge boundary features 103 can have a first section 103' with a length L' and a second section 103" with a second length L". The lengths L', L" can be from about 100 nm to about 10 µm. The lengths L', L" for a given edge region 109 can be the same or different from other edge regions, e.g., length L' of a first section 103A' of an edge boundary feature 103A is different from length L' of a first section 103B' of an edge boundary feature 103B. Although the edge boundary features 103 are shown having an L-shape, any shape is contemplated, such as a cross-shape.

The one or more edge boundary features 103 can include the same material that is included in the plurality of edge features 102. The distance d between adjacent first sections 103', e.g., the distance between 103A' and 103C', and the distance between 103B' and 103D', can be the same or different. Likewise, the d distance between adjacent second sections 103", e.g., the distance between 103A" and 103B", and the distance between 103C" and 103D", can be the same or different. The distances d can be from about 1 nm to about 5000 µm.

For each die 101, a die vector 105 is defined by a direction and a distance between two features in the die. For example, a die vector 105A is defined by the distance between two edge features 102A. In another example, a die vector 105A is defined between an edge feature 102A and an edge boundary feature 103A (not shown). In yet another example, a die vector 105A is defined between an edge feature 102A and a first portion 103A' of a boundary feature 103A (not shown). In each case, each die 101 (e.g., die 101A) has a corresponding die vector 105 (e.g., 105A). The die vector 105 can be determined using an image of the die 101, and the die vector is determined by measuring distances between pixels of the image of the die. Any desired imaging technique can be used to make an image of the die, such as SEM.

Other possible imaging techniques includes optical inspection and bright field inspection using any wavelength of light. The desired wavelength of light can be chosen by one skilled in the art to match the CD's of the edge features 102 and the edge boundary features 103. The error of the die vector 105 is about the size of one pixel. FIG. 1C illustrates four dies 101A, 101B, 101C, 101D with their corresponding die vectors 105A, 105B, 105C, 105D.

The die vectors 105 between adjacent dies 101 are used to compare the correct orientation and placement of the die patterns with respect to one another. For example, the die vector 105A of die 101A can be compared to the die vector 105B of die 101B. In FIG. 1C, the illustrated die vectors 105A, 105B are oriented correctly with respect to one another, and thus the dies 101A, 101B are correctly aligned.

During creation of the die 101 using the die pattern 111, the dimensions of the plurality of edge features 102 can differ from the plurality of edge feature patterns 112 of the die pattern 111. For example, process drift can result in a shift of location of an edge feature 102 from an edge feature pattern 112, the thickness of the edge feature can vary from the edge feature pattern, the underlying substrate of the die can be non-uniform, there can be noise in the image taken of the die, or there could be an error in the pattern recognition algorithm used to make the image of the die. In these cases, the die vector 105 (e.g., the die vector 105A illustrated in FIG. 1C) can vary from the pattern vector 115 (e.g., the pattern vector 115A illustrated in FIG. 1B). Thus, comparison of the die vector 105 and the pattern vector 115 is used to refine the die pattern 111 for the next die 101. The angle $\theta_{AA'}$ defined between the die vector 105A and the pattern vector 115A is calculated using the formula $$\cos(\theta_{AA'}) = (v_A \cdot v_{A'})/(|v_A||v_{A'}|),$$

where $|v_A|$ is the absolute value of the die vector, and $|v_{A'}|$ is the absolute value of the pattern vector, according to one embodiment. For small angles, the formula simplifies to $$\theta_{AA'} = (v_A \cdot v_{A'})/(|v_A||v_{A'}|),$$

as $\cos(\theta_{AA'}) \approx \theta_{AA'}$ for small $\theta_{AA'}$. The x-component of the die vector 105A is compared to the x-component of the pattern vector 115A, and the y-component of the die vector 105A is compared to the y-component of the pattern vector 115A, according to one embodiment. The error of angle $\theta_{AA'}$ is less than about 150 arcsec, according to one embodiment. The x-component difference, the y-component difference, and the angle $\theta_{AA'}$ can be used to correct the die pattern 111A, which results in a more accurate deposition of die 101A.

Figure 1D:
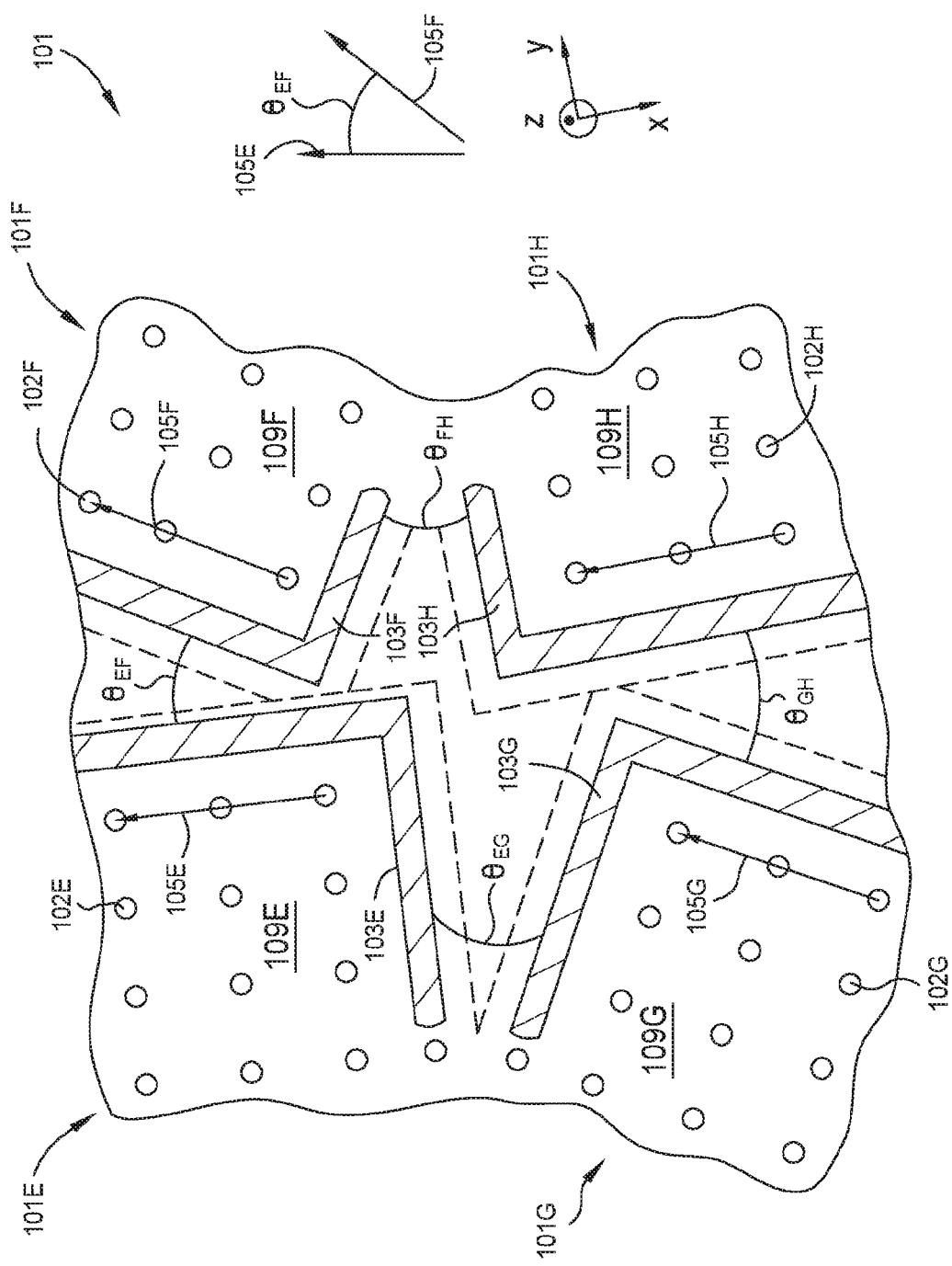
FIG. 1D illustrates a zoomed in portion of dies, according to one embodiment.

FIG. 1D illustrates a zoomed in portion of dies 101, according to one embodiment. The zoomed in portion of FIG. 1D illustrates an intersection of four dies 101E, 101F, 101G, 101H include edge regions 109E, 109F, 109G, 109H respectively. In comparison with FIG. 1C, which illustrates an intersection of four dies 101A, 101B, 101C, 101D which are properly aligned, FIG. 1D illustrates an intersection of four dies 101E, 101F, 101G, 101H that are improperly aligned. For example, the dies 101E, 101F, 101G, 101H are illustrated as not being at approximately 90° to one another, so that the corners of each of the dies do not meet at an approximately 90° angle.

For each die 101, a die vector 105 is defined by a direction and a distance between two features in the die. For example, a die vector 105E is defined by the distance between two edge features 102E. In another example, a die vector 105E is defined between an edge feature 102E and a boundary feature 103E (not shown). In yet another example, a die vector 105E is defined between an edge feature 102E and a first portion 103E' of a boundary feature 103E (not shown). In each case, each die 101 (e.g., die 101E) has a corresponding die vector 105 (e.g., 105E). FIG. 1D illustrates four dies 101E, 101F, 101G, 101H with their corresponding die vectors 105E, 105F, 105G, 105H.

The die vectors 105 between adjacent die patterns 111 are used to compare the correct orientation and placement of the die patterns with respect to one another. For example, the die vector 105E of die 101E can be compared to the die vector 105F of the 101F. In FIG. 1D, the illustrated die vectors 105E, 105F are not oriented correctly with respect to one another, and thus the dies 101E, 101F are not correctly aligned.

Thus, comparison of a die vector 105E of a die 101E and a die vector 105F of a die 101F is used to refine corresponding die patterns 111E, 111F for the next die 101E, 101F deposition. The angle $\theta_{EF}$ defined between the die vector 105E and the die vector 105F is calculated using the formula $$\cos(\theta_{EF}) = (v_E \cdot v_F)/(|v_E||v_F|),$$

where $|v_E|$ is the absolute value of the die vector 105E, and $|v_F|$ is the absolute value of the die vector 105F, according to one embodiment. For small angles, the formula simplifies to $$\theta_{EF} = (v_E \cdot v_F)/(|v_E||v_F|),$$

as $\cos(\theta_{EF}) \approx \theta_{EF}$ for small $\theta_{EF}$. The x-component of the die vector 105E is compared to the x-component of the die vector 105F, and the y-component of the die vector 105E is compared to the y-component of the die vector 105F, according to one embodiment. The x-component difference, the y-component difference, and the angle $\theta_{EF}$ can be used to correct the die patterns, which results in a more accurate deposition of dies 101E, 101F. The error of angle $\theta_{EF}$ is less than about 150 arcsec, according to one embodiment. For example, in the dies 101 illustrated in FIG. 1D, the angle $\theta_{EF}$ is approximately the same as the angle misalignment between adjacent dies 101E, 101F.

As described above, alignment vectors can be used to compare features of dies 101 and/or die patterns 111 to one another. The alignment vectors can include any combination of die vectors 105 (illustrated in FIGS. 1C-1D) and pattern vectors 115 (illustrated in FIG. 1B). Possible combinations of comparisons between alignment vectors include, but are not limited to, comparisons between die vectors 105 of adjacent dies 101 (e.g., comparison of die vectors 105A and 105B), comparisons between pattern vectors 115 of adjacent die patterns 111 (e.g., comparison of pattern vectors 115A and 115B), and comparisons between die vectors 105 and pattern vectors 115 (e.g., comparison of die vector 105A and pattern vector 115A). Although comparisons between two alignment vectors is described above and below, it is to be understood that comparison of any number of alignment vectors could be conducted.

In addition, although the dies 101 of die system 100 are shown to be in the same x-y plane in a single layer (e.g., dies 101A, 101B, 101C, 101D illustrated in FIG. 1C; dies 101E, 101F, 101G, 101H illustrated in FIG. 1D), the alignment vectors can be determined for dies in different layers, and comparison between alignment vectors in different layers can be performed as described in FIGS. 2 and 3 below.

Figure 2:
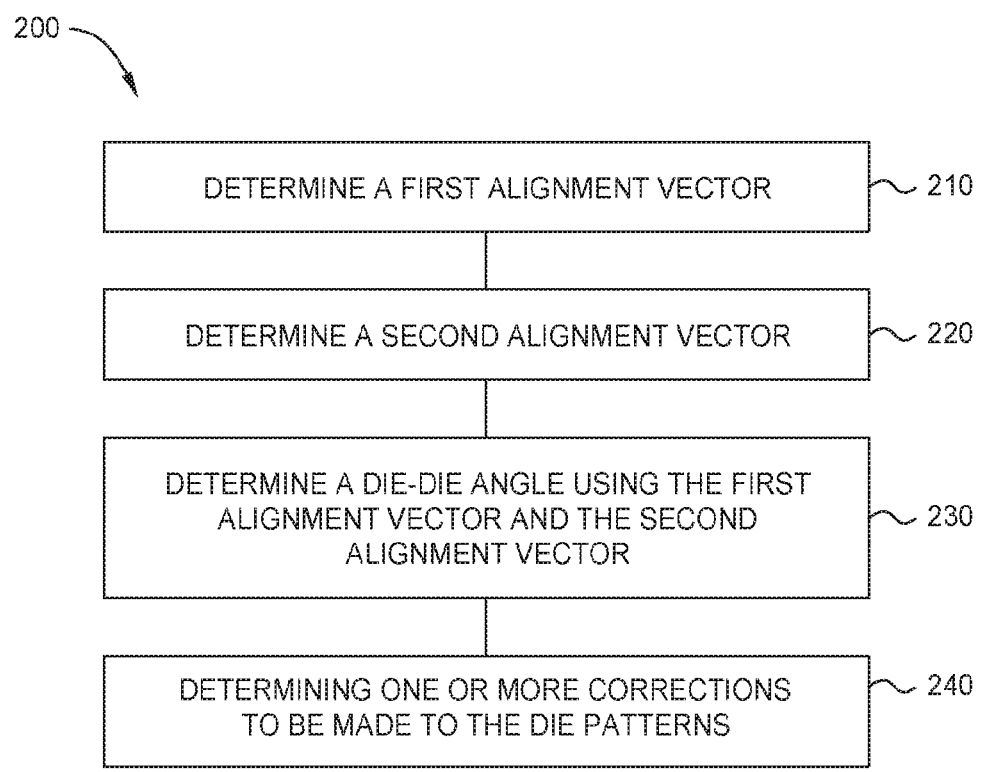
FIG. 2 is a flow diagram of method operations for comparing two alignment vectors, according to one embodiment.

FIG. 2 is a flow diagram of method 200 operations for comparing alignment vectors, according to one embodiment. Although the method 200 operations are described in conjunction with FIG. 2, persons skilled in the art will understand that any system configured to perform the method operations, in any order, falls within the scope of the embodiments described herein.

The method 200 begins at operation 210, where a first alignment vector $v_1$ is determined. The first alignment vector can be either a die vector 105 or a pattern vector 115 as described above. The first alignment vector $v_1$ can be determined using any suitable lithography tool or metrology tool in the art.

According to some embodiments, the first alignment vector $v_1$ is a die vector 105A. The first alignment vector $v_1$ is defined by a first x component and a first y component. The first x component is equal to the x distance between two of a plurality of edge features 102A of a first die 101A, and the first y component is equal to the y distance between two of the plurality of edge features of the first die. According to some embodiments, the first alignment vector $v_1$ is a pattern vector 115. The first alignment vector $v_1$ is defined by a first x component and a second y component. The first x component is equal to the x distance between two of a plurality of edge feature patterns 112A of a first die pattern 111A, and the first y component is equal to the y distance between the same two of the plurality of edge feature patterns of the first die pattern.

At operation 220, a second alignment vector $v_2$ is determined. The second alignment vector $v_2$ can be determined using any suitable lithography tool or metrology tool in the art.

According to some embodiments, the second alignment vector $v_2$ is a die vector 105B. The second alignment vector $v_2$ is defined by a second x component and a second y component. The second x component is equal to the x distance between two of a plurality of edge features of a second die 101B, and the second y component is equal to the y distance between two of the plurality of edge features of the second die.

According to some embodiments, the second alignment vector $v_2$ is a pattern vector 115B. The second alignment vector $v_2$ is defined by a second x component and a second y component. The second x component is equal to the x distance between two of a plurality of edge feature patterns 112B of a second die pattern 111B, and the first y component is equal to the y distance between two of the plurality of edge feature patterns of the second die pattern. At operation 230, a die-die angle $\theta_{12}$ is determined using the first alignment vector $v_1$ and the second alignment vector $v_2$.

The angle $\theta_{12}$ is calculated using the formula $$\cos(\theta_{12})=(v_1 \cdot v_2)/(|v_1||v_2|),$$

where $|v_1|$ is the absolute value of the first alignment vector $v_1$, and $|v_2|$ is the absolute value of the second alignment vector $v_2$, according to one embodiment. For small angles, the formula simplifies to $$\theta_{12}=(v_1 \cdot v_2)/(|v_1||v_2|),$$

as $\cos(\theta_{12}) \approx \theta_{12}$ for small $\theta_{12}$.

At operation 240, one or more corrections are determined to be made to the first die pattern 111A and/or the second die pattern 111B. The determining one or more corrections to the first die pattern 111A and the second die pattern 111B include altering the first die pattern to a first altered die pattern based on the angle 612, and altering the second die pattern to a second altered die pattern based on the angle $\theta_{12}$, according to one embodiment.

The second alignment vector $v_2$ is analogous with the first alignment vector $v_1$; that is, the die-die angle $\theta_{12}$ between alignment vectors $v_1$ and $v_2$ is expected to be small. For example, in the embodiment where the first alignment vector $v_1$ is a die vector for a die pattern (e.g. die vector 105A for die 101A) and the second alignment vector $v_2$ is a pattern vector for a die pattern (e.g., pattern vector 115A for die pattern 111A), a small die-die angle $\theta_{12}$ is expected for a deposited die to be similar to the die pattern. However, due to process drift or other factors listed above, a large die-die angle $\theta_{12}$ can indicate that the die 101A and associated pattern do not match the pattern 111A, and thus the one or more corrections can be made in future die patterns. For example, pattern features of the die pattern 111A can be shifted if the features of the corresponding die are out of place.

In another example, in the embodiment where the first alignment vector $v_1$ is a die vector for a first die pattern (e.g. die vector 105A for die 101A) and the second alignment vector $v_2$ is a die vector for a second die pattern (e.g. die vector 105B for die 101B), a small die-die angle $\theta_{12}$ is expected for adjacent dies to be similar to one another. However, due to process drift or other factors listed above, a large die-die angle $\theta_{12}$ can indicate that adjacent dies a do not match, and thus the one or more corrections can be made in future die patterns. For example, if the two dies are not aligned correctly (e.g., the dies 101E, 101F illustrated in FIG. 1D), the angle of the entire second die pattern with respect to the first die pattern can be adjusted.

Figure 3:
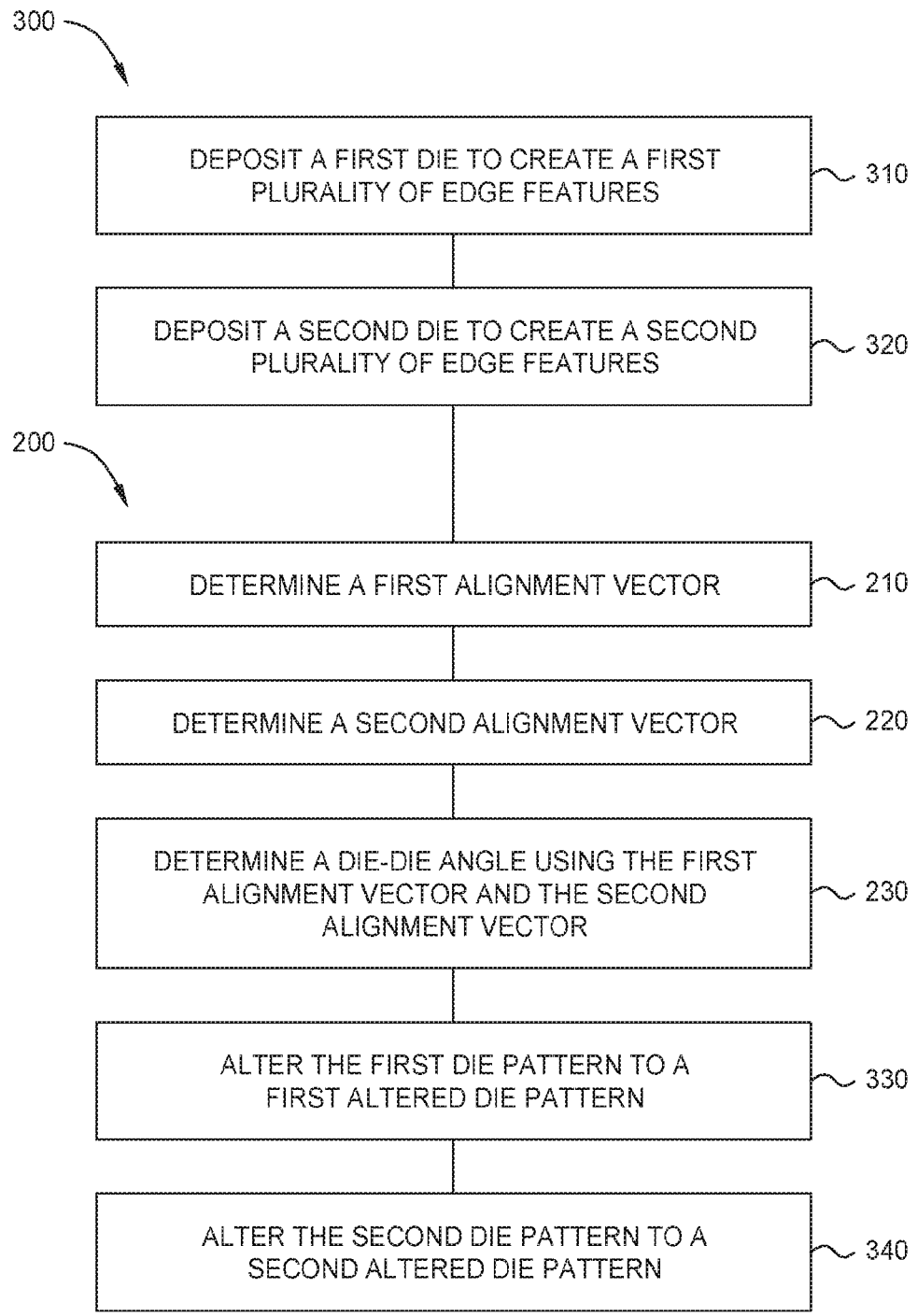
FIG. 3 is a flow diagram of method operations for determining die alignment, according to one embodiment.

FIG. 3 is a flow diagram of method 300 operations for a method for determining die alignment, according to one embodiment. Although the method 300 operations are described in conjunction with FIG. 3, persons skilled in the art will understand that any system configured to perform the method operations, in any order, falls within the scope of the embodiments described herein.

The method 300 begins at operation 310, where a first die 101A is deposited and a first plurality of edge features 102A is created. The first die 101A can be created using a first die pattern 111A, as described above.

At operation 320, a second die 101B is deposited and a second plurality of edge features 102B is created. The second die 101B can be created using a second die pattern 111B, as described above.

At operation 210, a first alignment vector $v_1$ is determined. The first alignment vector $v_1$ is a die vector 105A. The first alignment vector $v_1$ is defined by a first x component and a first y component. The first x component is equal to the x distance between two of a plurality of edge features 102A of a first die 101A, and the first y component is equal to the y distance between the same two of the plurality of edge features of the first die. The first alignment vector $v_1$ can be determined using any suitable metrology tool in the art.

At operation 220, a second alignment vector $v_2$ is determined. The second alignment vector $v_2$ is a die vector 105B. The second alignment vector $v_2$ is defined by a second x component and a second y component. The second x component is equal to the x distance between two of a plurality of edge features of a second die 101B, and the second y component is equal to the y distance between the same two of the plurality of edge features of the second die. The second alignment vector $v_2$ can be determined using any suitable metrology tool in the art.

At operation 230, a die-die angle $\theta_{12}$ is determined using the first alignment vector $v_1$ and the second alignment vector $v_2$.

The die-die angle $\theta_{12}$ is calculated using the formula $$\cos(\theta_{12})=(v_1 \cdot v_2)/(|v_1||v_2|),$$

where $|v_1|$ is the absolute value of the first alignment vector $v_1$, and $|v_2|$ is the absolute value of the second alignment vector $v_2$, according to one embodiment. For small angles, the formula simplifies to $$\theta_{12}=(v_1 \cdot v_2)/(|v_1||v_2|),$$

as $\cos(\theta_{12}) \approx \theta_{12}$ for small $\theta_{12}$.

At operation 330, the first alignment vector $v_1$ and the second alignment vector $v_2$ are compared to determine a correction to be made to the first die pattern 111A. In one embodiment, the first die pattern 111A is used as reference die, and the alignment correction data is saved by a metrology tool and sent to the lithography tool at the same time. The alignment correction data is used to correct the second die alignment during next cycle of exposure in operation 340. Thus, alignment correction data is used to make a first altered die pattern 111A'. The first altered die pattern 111A' incorporates improvements from the comparison of the first alignment vector $v_1$ and the second alignment vector $v_2$.

At operation 340, the first alignment vector $v_1$ and the second alignment vector $v_2$ are compared to determine a correction to be made to the second die pattern 111B. The second die pattern 111B is altered to a second altered die pattern 111B'. The second altered die pattern 1111B' incorporates improvements from the comparison of the first alignment vector $v_1$ and the second alignment vector $v_2$. The second altered die pattern 111B' incorporates some or all of the alignment correction data determined in operation 330, according to one embodiment.

As described above, a die system and a method of comparing alignment vectors is disclosed herein. The die system includes a plurality of dies arranged in a desired pattern. An alignment vector, such as a die vector, can be determined from edge features of the die. The alignment vectors can be compared to other dies or die patterns in the same system. A method of comparing dies and die patterns includes comparing die vectors and/or pattern vectors. The comparison between alignment vectors allows for fixing the die patterns for the next round of processing.

The methods provided allow accurate comparisons between as-deposited edge features, such that accurate stitching of dies can be achieved. Comparing a die vector and a pattern vector allows for compensation of the next die pattern due to errors in the first die pattern. The alignment vector provides a simple way to compare alignment and overlay between dies and die patterns.

While the foregoing is directed to embodiments of the present disclosure, other and further embodiments of the disclosure may be devised without departing from the basic scope thereof, and the scope thereof is determined by the claims that follow.

What is claimed is:

1. A lens of an augmented reality or virtual reality device comprising:
a plurality of dies, each die of the lens of the augmented reality or virtual reality device reflects or transmits wavelengths of light comprising:
a central region comprising a plurality of device features; and
one or more edge regions, each edge region comprising:
one or more edge boundary features at least partially surrounding the central region; and
a plurality of edge features disposed adjacent to the edge boundary features, the plurality of edge features include metalens array pillars, each edge feature filters a spectrum of light, each edge is configured to be separated from one another by a pre-determined distance.

2. The lens of claim 1, wherein the plurality of device features comprises one or more vias.

3. The lens of claim 1, wherein the plurality of device features comprises one or more line spaces.

4. The die system of lens claim 1, wherein a spacing between the plurality of device features is different than the spacing between the plurality of edge features.

5. A method of comparing alignment vectors, comprising:
determining a first alignment vector $v_1$ for a first die and a first die pattern;
determining a second alignment vector $v_2$ for a second die and a second die pattern;
determining a die-die angle $\theta_{12}$ using the first alignment vector $v_1$ and the second alignment vector $v_2$;
altering the first die pattern to a first altered die pattern based on the die-die angle $\theta_{12}$; and
altering the second die pattern to a second altered die pattern based on the die-die angle $\theta_{12}$.

6. The method of claim 5, wherein:
the first alignment vector $v_1$ is a die vector,
the first alignment vector $v_1$ is defined by a first x component and a first y component,
the first x component is equal to a x distance between two of a plurality of edge features of the first die,
the first y component is equal to a y distance between two of the plurality of edge features of the first die,
the second alignment vector is a die vector,
the second alignment vector $v_2$ is defined by a second x component and a second y component,
the second x component is equal to the x distance between two of a plurality of edge features of the second die, and
the second y component is equal to the y distance between two of the plurality of edge features of the second die.

7. The method of claim 6, wherein the determining the die-die angle $\theta_{12}$ comprises solving the equation $\cos(\theta_{12})=(v_1 \cdot v_2)/(|v_1||v_2|)$, where $|v_1|$ is the absolute value of the first alignment vector $v_1$, and $|v_2|$ is the absolute value of the second alignment vector $v_2$.

8. The method of claim 5, wherein:
the first alignment vector is a die vector,
the first alignment vector $v_1$ is defined by a first x component and a first y component,
the first x component is equal to a x distance between two of a plurality of edge features of the first die,
the first y component is equal to a y distance between two of the plurality of edge features of the first die,
the second alignment vector is a pattern vector,
the second alignment vector $v_2$ is defined by a second x component and a second y component,
the second x component is equal to the x distance between two of a plurality of edge feature patterns of the second die pattern, and
the second y component is equal to the y distance between two of the plurality of edge feature patterns of the second die pattern.

9. The method of claim 8, wherein the determining the die-die angle $\theta_{12}$ comprises solving the equation $\cos(\theta_{12})=(v_1 \cdot v_2)/(|v_1||v_2|)$, where $|v_1|$ is the absolute value of the first alignment vector $v_1$, and $|v_2|$ is the absolute value of the second alignment vector $v_2$.

10. The method of claim 8, wherein each of the first die and the second die further comprise one or more edge boundary features.

11. The method of claim 8, wherein the plurality of edge features comprises one or more pillars.

12. The method of claim 8, wherein the plurality of edge features comprises one or more vias.

13. The method of claim 8, wherein the plurality of edge features comprises one or more line spaces.

14. A method for determining die alignment, comprising:
creating a first plurality of edge features on a first die using a first die pattern;
creating a second plurality of edge features on a second die using a second die pattern;
determining a first alignment vector $v_1$ for the first die;
determining a second alignment vector $v_2$ for the second die;
determining a die-die angle $\theta_{12}$ using the first alignment vector $v_1$ and the second alignment vector $v_2$;
altering the first die pattern to a first altered die pattern based on the die-die angle $\theta_{12}$; and
altering the second die pattern to a second altered die pattern based on the die-die angle $\theta_{12}$.

15. The method of claim 14, wherein the method is repeated using the first altered die pattern as the first die pattern and the second altered die pattern as the die second pattern.

16. The method of claim 14, wherein:
the first alignment vector $v_1$ is a die vector,
the first alignment vector $v_1$ is defined by a first x component and a first y component,
the first x component is equal to a x distance between two of the first plurality of edge features of the first die,
the first y component is equal to a y distance between two of the first plurality of edge features of the first die,
the second alignment vector $v_2$ is a die vector, the second alignment vector $v_2$ is defined by a second x component and a second y component, the second x component is equal to the x distance between two of the second plurality of edge features of the second die, and the second y component is equal to the y distance between two of the second plurality of edge features of the second die.

17. The method of claim 16, wherein the determining the die-die angle $\theta_{12}$ comprises solving the equation $\cos(\theta_{12}) = (v_1 \cdot v_2)/(|v_1||v_2|)$, where $|v_1|$ is the absolute value of the first alignment vector $v_1$, and $|v_2|$ is the absolute value of the second alignment vector $v_2$.

18. The method of claim 14, wherein each of the first die and the second die further comprise one or more edge boundary features.

19. The method of claim 14, wherein each of the first die and the second die comprises a plurality of device features comprising one or more pillars.

\* \* \* \* \*